United States Patent
Brown et al.

(10) Patent No.: US 8,112,590 B2
(45) Date of Patent: Feb. 7, 2012

(54) METHODS AND APPARATUS FOR REDUCING COMMAND PROCESSING LATENCY WHILE MAINTAINING COHERENCE

(75) Inventors: Jeffrey Douglas Brown, Rochester, MN (US); Scott Douglas Clark, Rochester, MN (US); Mark S. Fredrickson, Rochester, MN (US); Charles Ray Johns, Austin, TX (US); David John Krolak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 11/846,697

(22) Filed: Aug. 29, 2007

(65) Prior Publication Data

US 2008/0052472 A1    Feb. 28, 2008

Related U.S. Application Data

(63) Continuation of application No. 11/348,969, filed on Feb. 7, 2006.

(51) Int. Cl.
*G06F 12/00* (2006.01)
*G06F 13/00* (2006.01)
*G06F 13/28* (2006.01)

(52) U.S. Cl. ........ 711/141; 707/999.2; 710/22; 711/124

(58) Field of Classification Search .................. 711/141
See application file for complete search history.

(56) References Cited

U.S. PATENT DOCUMENTS

| | | | | |
|---|---|---|---|---|
| 5,313,591 A | * | 5/1994 | Averill | 710/119 |
| 5,530,933 A | * | 6/1996 | Frink et al. | 711/141 |
| 5,987,579 A | * | 11/1999 | Nishtala et al. | 711/169 |
| 6,714,994 B1 | * | 3/2004 | Keller et al. | 710/5 |
| 2005/0114559 A1 | * | 5/2005 | Miller | 710/22 |

* cited by examiner

*Primary Examiner* — Brian Peugh
*Assistant Examiner* — Prasith Thammavong
(74) *Attorney, Agent, or Firm* — Dugan & Dugan PC (57) ABSTRACT

In a first aspect, a first method of reducing command processing latency while maintaining memory coherence is provided. The first method includes the steps of (1) providing a memory map including memory addresses available to a system; and (2) arranging the memory addresses into a plurality of groups. At least one of the groups does not require the system, in response to a command that requires access to a memory address in the group from a bus unit, to get permission from all remaining bus units included in the system to maintain memory coherence. Numerous other aspects are provided.

22 Claims, 4 Drawing Sheets

METHODS AND APPARATUS FOR REDUCING COMMAND PROCESSING LATENCY WHILE MAINTAINING COHERENCE

The present application is a continuation of and claims priority from U.S. patent application Ser. No. 11/348,969, filed Feb. 7, 2006, which is hereby incorporated by reference herein in its entirety.

FIELD OF THE INVENTION

The present invention relates generally to computer systems, and more particularly to methods and apparatus for reducing command processing latency while maintaining coherence.

BACKGROUND

A computer system may include a plurality of bus units (e.g., logical units such as microprocessors, memory management processors, input/output (I/O) processors and/or the like), coupled via one or more buses, that may require access to one or more memories of the system. For example, the system may include a hierarchy of bus units. More specifically, the system may include a first group of bus units in a first chip and a second group of bus units in a second chip. Further, the first and second chips may be on the same or different cards of the system.

During operation, one of the bus units may issue a pending coherent command on a bus. The pending command may require access to an address (e.g., cacheline) included in a memory of the system. In a conventional system, to maintain coherence, the system requires each of the remaining bus units of the system to respond to the issuing bus unit to indicate whether the bus unit locally stores the cacheline, and if so, the state of such a locally-stored cacheline. However, due to the hierarchy of the bus units, a response from one or more of the remaining bus units to the issuing bus unit may take a long time, and therefore, increase command latency. For example, assuming the first and second chips are on the same card, if the issuing bus unit is in the first chip, respective responses from the bus units in the second chip may require a long time. If the first and second chips are on different cards, respective responses from the bus units in the second chip may require an even longer time. Accordingly, improved methods and apparatus for reducing command processing latency while maintaining coherence are desired.

SUMMARY OF THE INVENTION

In a first aspect of the invention, a first method of reducing command processing latency while maintaining memory coherence is provided. The first method includes the steps of (1) providing a memory map including memory addresses available to a system; and (2) arranging the memory addresses into a plurality of groups. At least one of the groups does not require the system, in response to a command that requires access to a memory address in the group from a bus unit, to get permission from all remaining bus units included in the system to maintain memory coherence.

In a second aspect of the invention, a first apparatus for reducing command processing latency while maintaining memory coherence is provided. The first apparatus includes logic and/or memory adapted to store a memory map including memory addresses available to a system. The memory addresses are arranged into a plurality of groups in which at least one of the groups does not require the system, in response to a command that requires access to a memory address in the group from a bus unit, to get permission from all remaining bus units included in the system to maintain memory coherence.

In a third aspect of the invention, a first computer program product is provided. The computer program product includes a medium readable by a computer, the computer readable medium having computer program code adapted to (1) provide a memory map including memory addresses available to a system; and (2) arrange the memory addresses into a plurality of groups, wherein at least one of the groups does not require the system, in response to a command that requires access to a memory address in the group from a bus unit, to get permission from all remaining bus units included in the system to maintain memory coherence.

In a fourth aspect of the invention, a first system for reducing command processing latency while maintaining memory coherence is provided. The first system includes (1) a plurality of bus units, wherein two or more of the bus units may be on different chips, cards or computers of the system; (2) a plurality of buses coupling the bus units; (3) a plurality of memories, each of which corresponds to one or more of the bus units; and (4) a memory map including memory addresses available to a system. The memory addresses are arranged into a plurality of groups such that at least one of the groups does not require the system, in response to a command that requires access to a memory address in such a group from a first bus unit, to get permission from all remaining bus units included in the system to maintain memory coherence. Numerous other aspects are provided, as are systems, apparatus and computer program products in accordance with these and other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

The present invention provides improved methods and apparatus for reducing command processing latency while maintaining system coherence. More specifically, the present methods and apparatus may employ a system map that does not require system-wide memory coherency. A system map includes all memory addresses available to the system. However, the present methods and apparatus may arrange addresses in the system memory map into groups or domains. The system may only be required to maintain coherence of addresses included in the same group or domain. The memory map groups or domains may be based on system hardware hierarchy and/or applications intended to be executed by the system. For example, the memory map may include a first group or domain of addresses corresponding to memory addresses associated with bus units included in a first chip, a second group or domain of addresses corresponding to memory addresses associated with bus units included in a second chip, and so on. Therefore, the system may only be required to maintain coherence of memory addresses associated with bus units within the same chip. Thus, if a bus unit in the chip issues a command, only remaining bus units in the chip may be required to respond. However, memory map addresses may be arranged into groups or domains differently. For example, if a system designer or architect contemplates a first card of the system will execute a first application and a second card of the system will execute a second application, the memory map may include a first group or domain of addresses corresponding to memory addresses associated with all bus units in the first card of the system, a second group or domain of addresses corresponding to memory addresses associated with all bus units in the second card of the system, and so on. Therefore, the system may only be required to maintain coherence of memory addresses associated with bus units within the same card. Thus, if a bus unit in the card issues a command, only remaining bus units in the card may be required to respond. By reducing the coherency requirement in the manner described above, the present methods and apparatus may reduce command processing latency while maintaining system coherence.

Figure 1:
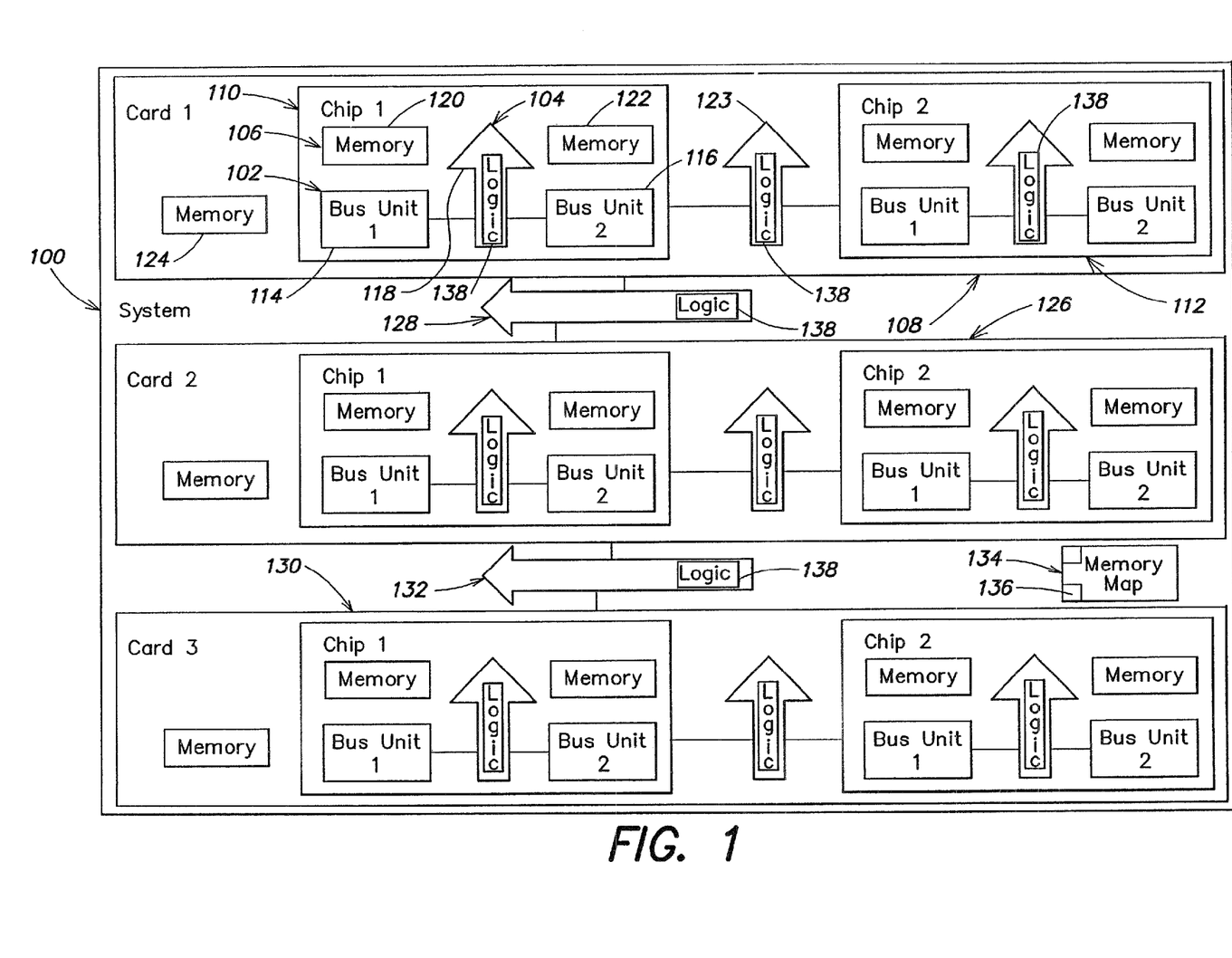
FIG. 1 illustrates a system adapted to reduce command processing latency while maintaining coherence in accordance with an embodiment of the present invention.

FIG. 1 illustrates a system adapted to reduce command processing latency while maintaining coherence in accordance with an embodiment of the present invention. With reference to FIG. 1, the system 100 may include a plurality of bus units 102, such as microprocessors, memory management processors, input/output (I/O) processors and/or the like. The bus units 102 may be coupled via one or more of a plurality of buses (e.g., processor buses) 104 included in the system 100. Two or more of the bus units 102 may be included in different chips and/or cards included in the system 100. Further, the system 100 may include a plurality of memories 106, each of which may correspond to one or more of the bus units 102.

For example, the system 100 may include a first card 108 including first and second chips 110, 112. The first chip 110 may include a first bus unit 114 coupled to a second bus unit 116 via a bus 118 included in the first chip 110. Further, the first chip 110 may include a first memory 120 corresponding to the first bus unit 114 and a second memory 122 corresponding to the second bus unit 116. However, the first chip 110 may include a larger or smaller number of memories. Further, in some embodiments, the first and second chips 110, 112 may share one or more such memories. The configuration of the second chip 112 may be the same as the first chip 110. Further, the first and second chips 110, 112 of the first card 108 may be coupled via a bus 123. Additionally, in some embodiments, the first card 108 may include a memory 124 corresponding to bus units 114, 116 included in the first and/or second chips 110, 112. Alternatively, the first card 108 may not include such memory 124.

The system 100 may include a second card 126 coupled to the first card 108 via a bus 128. Further, the system 100 may include a third card 130 coupled to the second card 126 via a bus 132. The configuration of the second and third cards 126, 130 may be the same as the first card 108. Consequently, bus units 114, 116 may communicate via the buses 104. The system 100 described above is exemplary, and therefore, the system 100 may be configured differently. For example, each chip 110, 112 of each card 108, 126, 130 may include a larger or smaller number of bus units 114, 116, buses 118 and/or memories 120, 122. Further, each card 108, 126, 130 may include a larger or smaller number of chips 110, 112 and/or memories 124. Additionally, the system 100 may include a larger or smaller number of cards 108, 126, 130, which may be coupled in the same or a different manner.

The system 100 is adapted to reduce command processing latency while maintaining coherence of memories 120, 122, 124 included therein. For example, in contrast to a conventional system, the system 100 may process a pending command requiring access to a memory address from one of the plurality of bus units 114, 116 included in the system 100 without requiring permission from all remaining bus units 114, 116 of the system 100. Permission from a remaining bus unit 114, 116 may refer to a snoop response in which the remaining bus unit 114, 116 indicates whether the bus unit 114, 116 locally stores the memory address, and if so, the status of the locally stored memory address. Assume the system 100 is processing a pending command from the first bus unit 114 in the first chip 110 of the first card 108, a large amount of time (e.g., a large number of clock cycles) may be required for such a bus unit 114 to receive permission from a bus unit 114, 116 included in another chip 112 included in the same card 108 (e.g., due to the chip crossing involved). An even longer amount of time may be required for the first bus unit 114 in the first chip 110 of the first card 108 to receive permission from a bus unit 114, 116 included in another card 126, 130 included in the system 100 (e.g., due to the card crossing involved).

However, during system operation, different groups of bus units 114, 116 on the same chip 110, 112, bus units 114, 116 on different chips 110, 112, or bus units 114, 116 on different cards 108, 126, 130 may be employed for (e.g., to execute) different applications. Therefore, while processing a pending command from a first bus unit 114, 116 included in a first set or group of one or more bus units 114, 116 employed for a first application, the first bus unit 114, 116 may not need to know a state of memories 120, 122, 124 corresponding to bus units 114, 116 employed for different applications. By requiring the bus unit 114 which issued the pending command to await permission from every remaining bus unit 114, 116 of the system 100 during such operation to ensure memory coherence, latency may be introduced in command processing.

Consequently, to avoid such unnecessary command processing delay, the system 100 may employ an improved memory map 134 stored by logic (e.g., memory). The improved memory map 134 may be adapted to store memory addresses available to the system 100 (e.g., memory addresses provided by all of the plurality of memories 106), and may be implemented in hardware (e.g., logic), a computer program product and/or software executed by the system 100. The memory map 134 may enable the system 100 to reduce command processing latency while maintaining system coherence. To wit, the improved memory map 134 may enable the system 100 to reduce coherent command processing latency while maintaining coherence of memories 106 included in the system 100. More specifically, in contrast to a memory map included in the conventional system, memory addresses included in the memory map 134 may be arranged into a plurality of domains or groups 136 such that at least one of the groups does not require the system 100, in response to a command that requires access to a memory address in such a group from a bus unit 114, 116, to get permission from all remaining bus units 114, 116 included in the system 100 to maintain memory coherence. A system designer or architect may arrange memory addresses of the system memory map 134 into such groups or domains 136, which may require less than full system-wide coherency. The system 100 may take advantage of such a reduced coherency requirement to dramatically reduce command processing latency. In this manner, the memory map 134 may define a coherency domain hierarchy for a multiple bus unit (e.g., multiprocessor) memory system 100.

Exemplary groups or domains may include one or more of non-coherency, chip-wide coherency, card-wide coherency, box-wide coherency (e.g., computer- or server-wide coherency) and system-wide coherency. In the non-coherency domain, before executing a command, which requires access to a memory address in the domain, from a bus unit 114, 116, the system 100 may not be required to get permission from all remaining bus units 114, 116 in the system 100. Permission may only be required from the owner of (e.g., bus unit 114, 116 corresponding to) the memory 120, 122, 124 that is the target of the transaction before executing the command.

In the chip-wide coherency domain, before a pending command, which requires access to a memory address in the domain, from a bus unit 114, 116 may be executed, the system 100 may be required to get permission from all remaining bus units 114, 116 which reside on the same chip 110, 112 as the bus unit 114, 116 whose command is pending (e.g., the issuing bus unit). The system 100 may ensure all bus units 114, 116 on the chip 110, 112 maintain a coherent view of system memory 120, 122.

In the card-wide coherency domain, before executing a pending command, which requires access to a memory address in the domain, from a bus unit 114, 116, the system 100 may be required to get permission from all remaining bus units 114, 116 which reside on the same card 108, 126, 130 as the bus unit 114, 116 whose command is pending. The system 100 may ensure all bus units 114, 116 on the card 108, 126, 130 maintain a coherent view of system memory 120, 122, 124.

In the box-wide coherency domain, before executing a pending command, which requires access to a memory address in the domain, from a bus unit 114, 116, the system 100 may be required to get permission from all remaining bus units 114, 116 which reside in the same box as the bus unit 114, 116 whose command is pending. The system 100 may ensure all bus units 114, 116 in the box maintain a coherent view of system memory 120, 122.

In the system-wide coherency domain, before executing a pending command, which requires access to a memory address in the domain, from a bus unit 114, 116, the system 100 may be required to get permission from all remaining bus units 114, 116 which reside in the system 100. The system 100 may ensure all bus units 114, 116 on the card 108, 126, 130 maintain a coherent view (e.g., a system-wide coherent view) of system memory 120, 122, 124.

Therefore, when a bus unit 114, 116 places a pending command requiring access to a memory address on a bus 104 coupled thereto, the system 100 may determine the memory address is included in a group or domain 136 of the memory map 134 that does not require permission from all remaining bus units 114, 116 included in the system 100 but rather only requires permission from remaining bus units 114, 116 included in the same chip 110, 112, same card 108, 126, 130, etc. For example, buses 118, 128, 132 included in the system 100 may include respective logic 138 adapted to make the above-described determination. Such logic 138 may include one or more address pattern and address mask registers to specify address ranges. Further, the logic 138 may include compare logic adapted to compare a memory address required by a pending command issued on the bus 118, 128, 132 by a bus unit 114, 116 coupled thereto to address ranges specified by the address pattern and mask registers. However, the logic 138 may include a larger or smaller amount of and/or different combinational and/or sequential logic.

Figure 2:
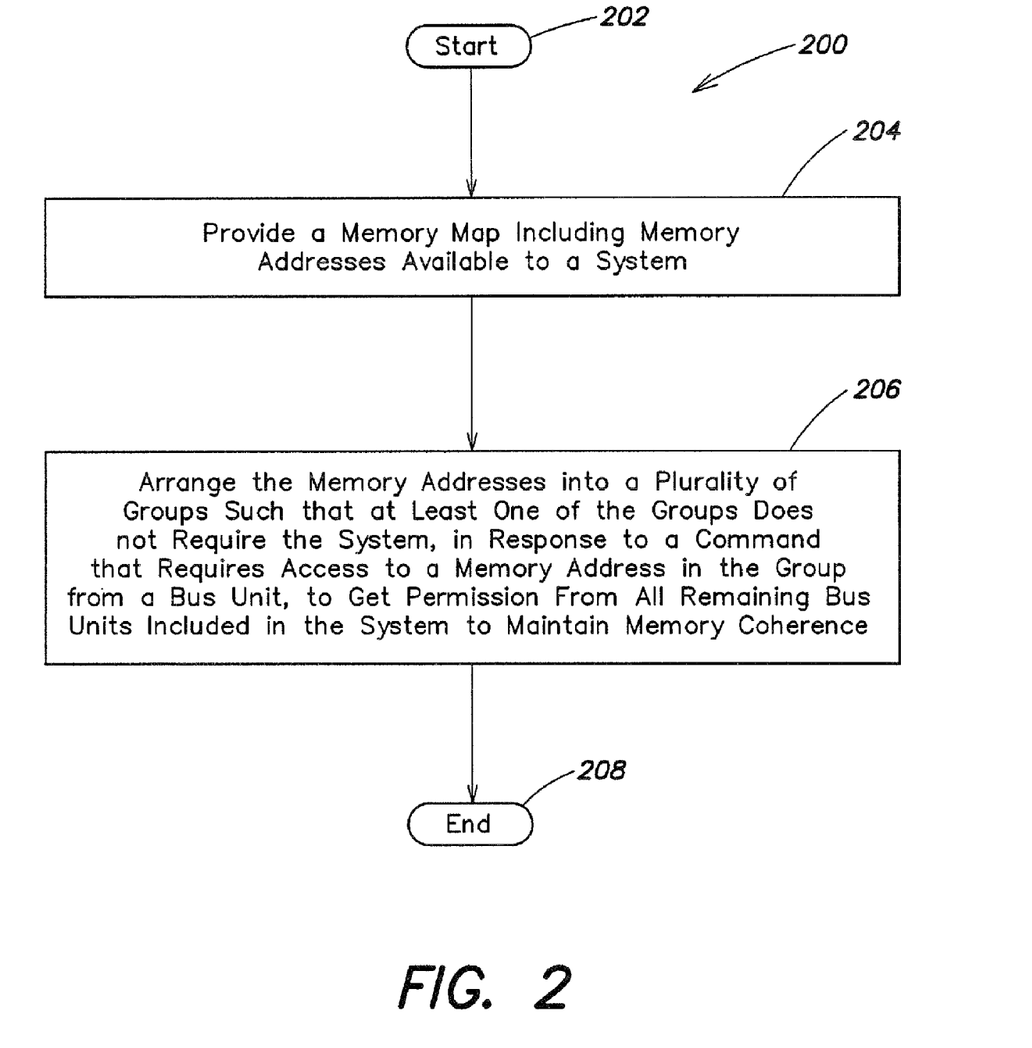
FIG. 2 illustrates a first exemplary method of reducing command processing latency while maintaining coherence in accordance with an embodiment of the present invention.

FIG. 2 illustrates a first exemplary method 200 of reducing command processing latency while maintaining coherence in accordance with an embodiment of the present invention. With reference to FIG. 2, in step 202, the method 200 begins. In step 204, a memory map 134 including memory addresses available to the system 100 may be provided. The memory map 134 may be based on memories 120, 122, 124 included in the system 100. More specifically, the memory map 134 may be based on memory addresses provided by each memory 120, 122, 124 included in the system 100.

In step 206, the memory addresses may be arranged into a plurality of groups or domains. At least one of the groups or domains does not require the system 100, in response to a command that requires access to a memory address in the group from a bus unit 114, 116, to get permission from all remaining bus units 114, 116 included in the system 100 to maintain memory coherence. A system designer or architect may arrange the memory addresses in the memory map 134 into such groups or domains. The arrangement of memory addresses into such groups or domains may be fixed (e.g., performed once during machine design) or may be programmable (e.g., software-controlled or set up during configuration). The system designer may define the groups or domains based on a hierarchy of the system hardware. For example, the system designer may define a first group or domain of memory address in the memory map 134 to include addresses associated with memory corresponding to bus units 114, 116 included in a first chip 110 of the first card 108, define a second group or domain of memory addresses in the memory map 134 to include addresses associated with memory corresponding to bus units 114, 116 included in the second chip 112 of the first card 108, and so on. However, system designer may define the plurality of groups or domains of memory addresses in the memory map 134 in a different manner. Such a definition may be fixed or programmable.

Therefore, to process a pending command from a bus unit 114, 116 included in a first chip 110 of the first card 108, the system 100 may only require permission from remaining bus units 114, 116 included in the first chip 110 of the first card 108. Similarly, to process a pending command from a bus unit 114, 116 included in a second chip 112 of the first card 108, the system 100 may only require permission from remaining bus units 114, 116 included in the second chip 112 of the first card 108.

Alternatively, the system designer or architect may define a first group or domain of memory address in the memory map 134 to include addresses associated with memory corresponding to bus units 114, 116 included in the first card 108, define a second group or domain of memory addresses in the memory map 134 to include addresses associated with memory corresponding to bus units 114, 116 included in the second card 126, and so on. Therefore, to process a pending command from a bus unit 114, 116 included in the first card 108, the system 100 may only require permission from remaining bus units 114, 116 included in the first card 108. Similarly, to process a pending command from a bus unit 114, 116 included in the second card 108, the system 100 may only require permission from remaining bus units 114, 116 included in the second card 108.

Additionally, the system 100 may employ the memory map 134 to process the command, which requires access to a memory address, issued by a bus unit 114, 116. Assume the first bus unit 114 in the first chip 110 of the first card 108 provides a pending command requiring access to a memory address on the bus 118 coupled thereto. For example, logic 138 included in the bus 118 may determine the memory address required by the command is included in a group or domain of the memory map 134 that does not require the system 100 to get permission from all remaining bus units 114, 116 included in the system 100 to maintain memory coherence but rather requires the system 100 to get permission from remaining bus units 114, 116 included in the same card (e.g., the first card 108) as the first bus unit 114, 116. Additionally, in some embodiments, the system 100 may employ an address modifier or control bit and/or a command type to determine from which of the remaining bus units 114, 116 permission is required. An address modifier or control bit may be write-through/non-cacheable/memory coherent/guarded (WIMG) bits known to one of skill in the art or similar bits. For example, based on a status of the WIMG bits, the system 100 may require permission from all bus units 114, 116 included therein regardless of the memory map group or domain that includes the required address. Further, command type may indicate, for example, whether a command is a read or write command or an interrupt. For example, if a command is an interrupt requiring access to a memory address, the system 100 may require permission from all bus units 114, 116 included therein regardless of the memory map group or domain that includes the required address.

Once the first bus unit 114, 116 gets permission from remaining bus units 114, 116 included in the first card 108, the system 100 may execute the command, thereby completing processing of the command. Therefore, the first bus unit 114 in the first chip 110 of the first card 108 may not be required to get permission from bus units 114, 116 included in remaining cards 126, 130 of the system 100. Consequently, processing of such a command may not be delayed by cross-card communication which would take a long time. In this manner, the system 100 may reduce coherent command processing latency while maintaining memory coherence.

Thereafter, step 208 may be performed. In step 208, the method 200 ends. Through use of the present methods, the system 100 may process a command from a bus unit 114, 116 and maintain memory coherence without unnecessarily requiring permission from all remaining bus units 114, 116 of the system 100. Consequently, the system 100 may reduce coherent command processing latency while maintaining memory coherence.

Figure 3A:
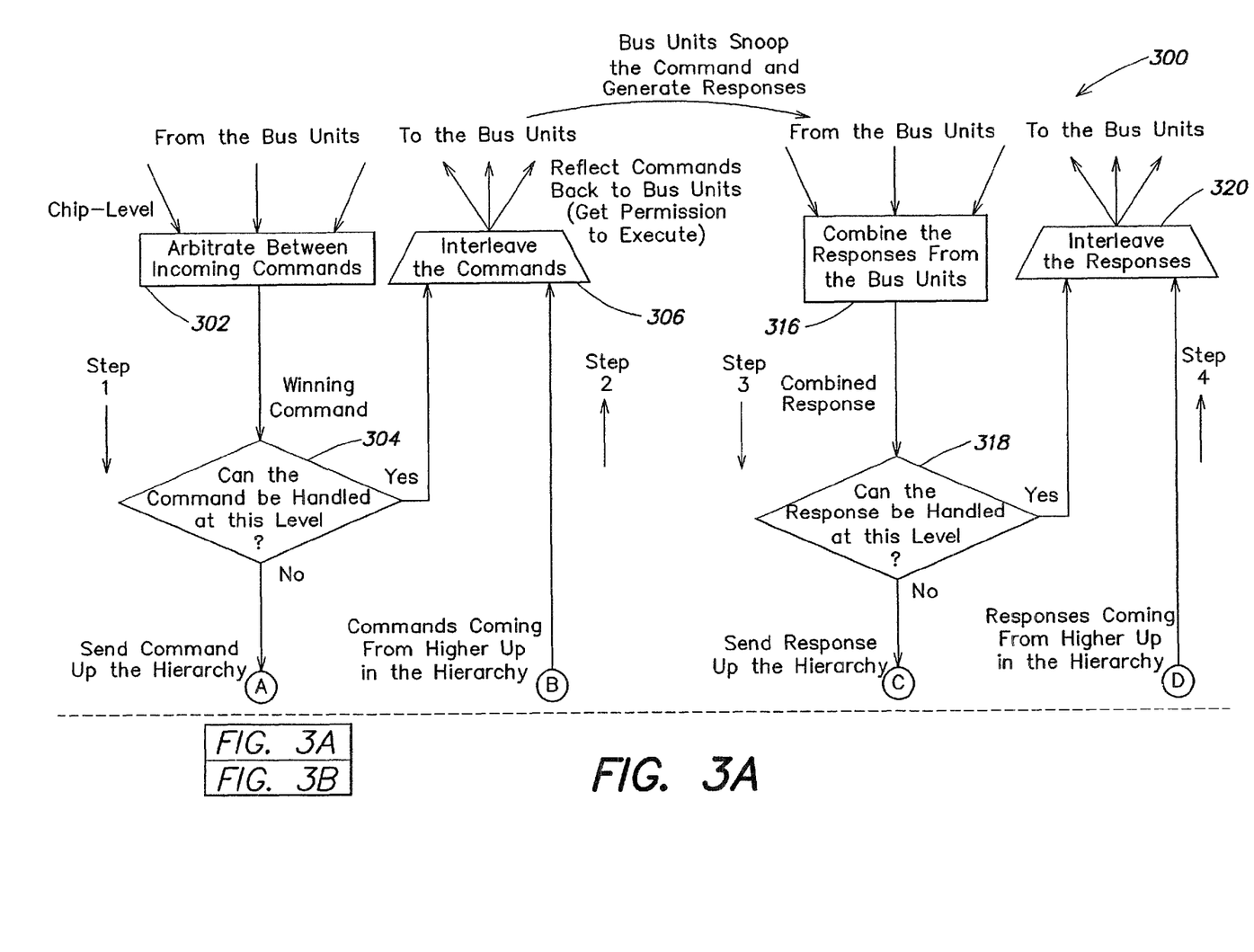
FIGS. 3A-B illustrate a process flow of a second exemplary method of reducing command processing latency while maintaining coherence in accordance with an embodiment of the present invention.
Figure 3B:
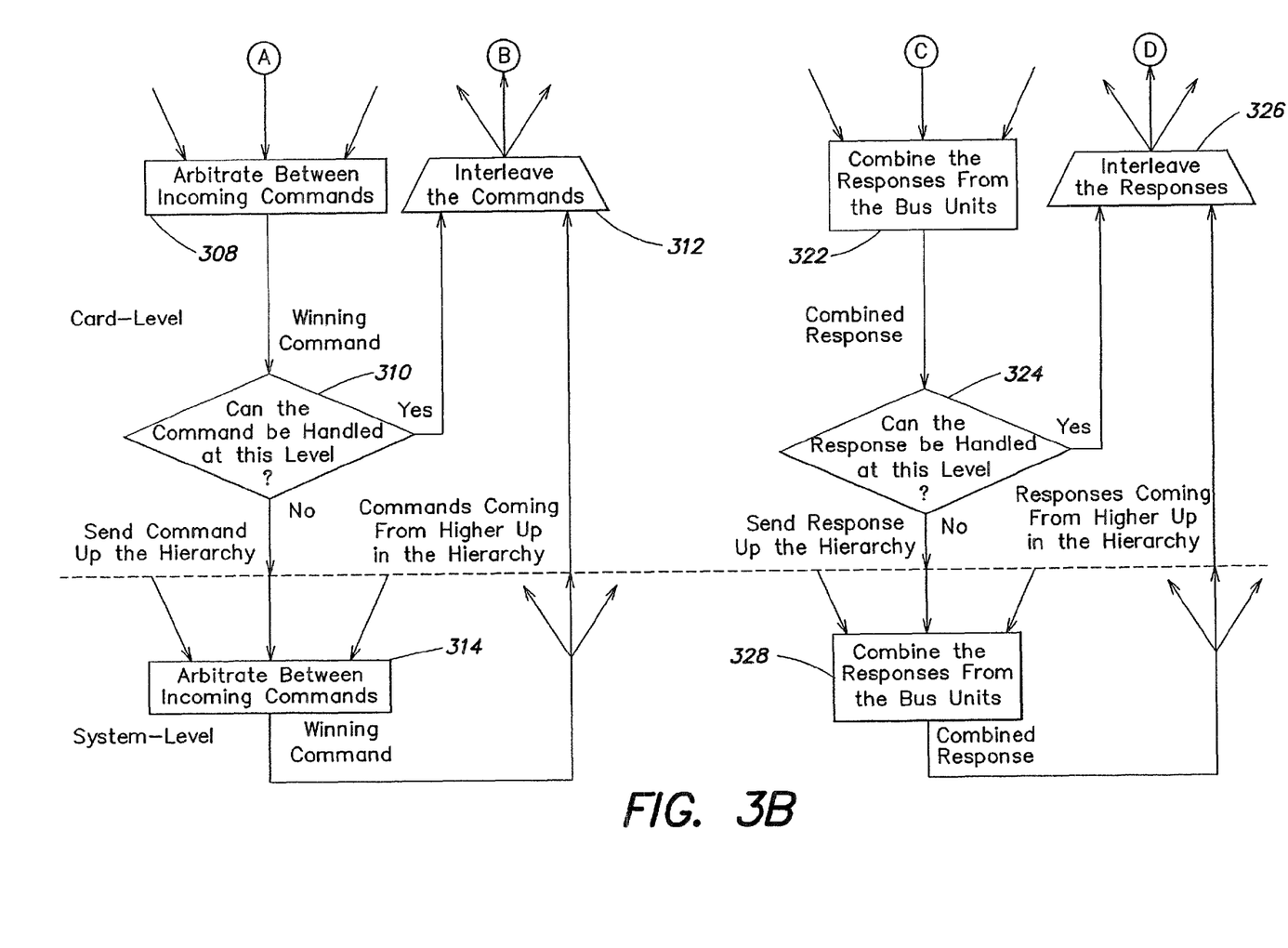

FIGS. 3A-B illustrate a process flow of a second exemplary method of reducing command processing latency while maintaining coherence in accordance with an embodiment of the present invention. The second exemplary method may employ a memory map 134 arranged into groups or domains such that a multi-level (e.g., three-level) coherency domain hierarchy may be defined. With reference to FIGS. 3A-B, in step 302, the method 300 begins. In step 302, upon receiving pending commands from one or more bus units 114, 116 included in a first chip 110, 112 on a bus 118 coupled to the bus units 114, 116, the system 100 may arbitrate between such incoming pending commands. Each pending command may require access to a memory address. More specifically, the bus 118 may include logic adapted to select one of the pending commands as a winning command. In step 304, the system 100 may determine whether the winning command may be handled at the current level of the coherency domain hierarchy (e.g., a first level such as a chip level) as defined by the memory map groups or domains. The hardware associated with each level may decide whether or not a given command can be processed at that level or whether it needs to be forwarded up to the next level in the hierarchy. For example, logic 138 included in the bus 118 coupled to such bus units 114, 116 may be employed to determine whether the winning command may be handled at the current level. If the coherency groups or domains are defined as specific ranges in the memory map, then the logic 138 may employ address range checking to make the determination. The logic 138 employed for such checking may include, but not be limited to, address pattern and address mask registers, and logic to compare a command address to ranges specified by the pattern and mask registers. More specifically, the logic 138 may compare an address stored thereby with the address required by the winning command to determine which memory map group or domain includes the required address. Additionally, the decision whether the command may be handled at the current level may be based on address modifier/cache control (WIMG) bits, if any, and a command type indicator associated with the command. In this manner, the system 100 may enforce coherency between read and/or write commands at the chip-level only. However, because an interrupt may need to be seen by all bus units 114, 116 in the system 100, the interrupt may be transmitted up to the highest level (e.g., system level) of the coherency domain hierarchy.

If the required address is included in a group or domain of the memory map 134 that only requires permission from remaining bus units 114, 116 included in the same chip 110, 112, step 306 may be performed. In step 306, the winning command may be interleaved with commands received in the chip from a higher level of the hierarchy (e.g., the card level). For example, the winning command may be selected during a first time period, and a command from the higher level of hierarchy may be selected during a subsequent time period or vice versa. The selected command may be transmitted (e.g., reflected) to all bus units 114, 116 from which the issuing bus unit 114, 116 must obtain permission before executing the command. In response to receiving the selected command, such bus units 114, 116 initiate a snoop window in which each such bus unit 114, 116 may determine whether the memory address required by the pending command is stored locally thereby, and if so, determine the status of the locally stored memory address. Such information generated by each such bus unit 114, 116 may be transmitted to the bus unit 114, 116 whose command is pending (as described below with reference to steps 316-328).

Alternatively, if in step 304, the system 100 determines the winning command may not be handled at the current level (e.g., a chip level) as defined by the memory map groups or domains, the selected command may be transmitted to buses 128, 132 coupled to all bus units 114, 116 included in the next higher level in the hierarchy (e.g., the card level). It should be noted similar selected commands may be received from a plurality of chips 110, 112 in the system 100. Thereafter, step 308 may be performed (e.g., for each bus 128, 132 included in the current level). In step 308, the system 100 may arbitrate between such incoming pending commands. More specifically, each bus 123 that receives such incoming pending commands may include logic adapted to select one of the incoming pending commands as a winning command. In step 310, the system 100 may determine whether the winning command may be handled at the current level (e.g., a second level such as a card level) as defined by the memory map groups or domains. For example, logic 138 included in the bus 123 coupled to bus units 114, 116 included in the current level may be employed to determine whether the winning command may be handled at the current level. More specifically, the logic 138 may compare an address stored thereby with the address required by the winning command to determine which memory map or domain includes the required address.

If the required address is included in a group or domain of the memory map 134 that only requires permission from remaining bus units 114, 116 included in the same card 108, 126, 130, step 312 may be performed. In step 312, the winning command may be interleaved with commands received in the card from a higher level of the hierarchy (e.g., the system level). For example, the winning command may be selected during a first time period, and a command from the higher level of hierarchy may be selected during a subsequent time period or vice versa. A plurality of winning commands may be transmitted to the bus 118 coupled to the issuing bus unit 114, 116. Thereafter, step 306 may be performed.

Alternatively, if in step 310, the system 100 determines the winning command may not be handled at the current level (e.g., a card level) as defined by the memory map groups or domains, the selected command may be transmitted to buses 128, 132 coupled to all bus units 114, 116 included in the next higher level in the hierarchy (e.g., a third level such as the system level). It should be noted similar selected commands may be received from a plurality of cards 108, 126, 130. Thereafter, step 314 may be performed (e.g., for each bus 128, 132 included in the current level). In step 314, the system 100 may arbitrate between such incoming pending commands. More specifically, each bus 128, 132 that receives such incoming pending commands may include logic adapted to select one of the incoming pending commands as a winning command. Since the winning command is at the highest level (e.g. the system level), such command has to be handled at the current level. The winning command may be transmitted to the next lower level (e.g., card level) where such command may be interleaved with other commands (e.g., commands which the system 100 determined could be handled by the card level in step 310). It should be noted that a plurality of such commands may be transmitted to remaining lower levels (e.g., the card level) of the hierarchy.

In this manner, steps 302, 304, 308, 310 and 314 may serve as sub-steps in a first step in which a command requiring access to a memory address from a bus unit 114, 116 is arbitrated up through as many levels of the coherency domain hierarchy as required. Further, steps 312 and 306 may serve as sub-steps in a second step in which the command wins arbitration and may be reflected back to remaining bus units 114, 116 included in the same level as the bus unit 114, 116 whose command is pending. Each of the remaining bus units 114, 116 may snoop the command to determine whether the memory address is stored locally thereby. If so, such remaining bus unit 114, 116 may determine a status of such locally-stored memory address. Each remaining bus unit 114, 116 may transmit such information, which may determine whether the command may be executed or not, as a response to the issuing bus unit 114, 116. In the response, bus units 114, 116 corresponding to (e.g., owning) the targeted memory address, or who have a cached copy of the targeted memory address may state their intent for such memory address if the command is executed.

In step 316, responses required from the remaining bus units 114, 116 (e.g., included in the same group of bus units 114, 116 as the issuing bus unit 114, 116) to maintain coherence may be collected to form a combined response. In step 318, the system 100 may determine whether the combined response may be handled at the current level (e.g., a chip level) as defined by the memory map groups or domains. For example, logic 138 included in the bus 118 coupled to such bus units 114, 116 may be employed to determine whether the combined response may be handled at the first level. More specifically, the logic 138 may compare an address stored thereby with the address required by the command to determine which memory map or domain includes the required address. Alternatively, the determination made in step 318 may be based on the determination made in step 304.

If the required address is included in a group or domain of the memory map 134 that only requires permission remaining bus units 114, 116 included in the same chip 110, 112, such remaining bus units 114, 116 may receive the combined response. In this manner, the combined response, which will be fed back to the bus units 114, 116, may be determined. Thereafter, step 320 may be performed. In step 320, the combined response may be interleaved with other combined responses received in the chip 110, 112 from a higher level of the hierarchy (e.g., the card level). For example, the combined response associated with the issued command may be selected during a first time period, and a combined response associated with another command from the higher level of hierarchy may be selected during a subsequent time period or vice versa. In this manner, the selected combined response associated with the issued command may be transmitted to the issuing bus unit 114, 116 (and possibly to any other bus units 114, 116 required to execute the command).

Alternatively, if in step 318, the system 100 determines the combined response may not be handled at the current level (e.g., the chip level) as defined by the memory map groups or domains, the combined response may be transmitted to buses 123 coupled to all bus units 114, 116 included in the next higher level in the hierarchy (e.g., the card level). It should be noted similar responses may be received from a plurality of chips 110, 112. Thereafter, step 322 may be performed (e.g., for each bus 123 included in the current level). In step 322, responses required from the bus units 114, 116 to maintain coherence (e.g., included in the same group of bus units 114, 116 as the issuing bus unit 114, 116) may be collected to form a combined response. In step 324, the system 100 may determine whether the combined response may be handled at the current level (e.g., a chip level) as defined by the memory map groups or domains. For example, logic 138 included in the bus 123 coupled to such bus units 114, 116 may be employed to determine whether the combined response may be handled at the second level. More specifically, the logic 138 may compare an address stored thereby with the address required by the command to determine which memory map group or domain includes the required address. Alternatively, the determination made in step 324 may be based on the determination made in step 310.

If the required address is included in a group or domain of the memory map 134 that only requires permission remaining bus units 114, 116 included in the same card 108, 126, 130, such remaining bus units 114, 116 may receive the combined response. In this manner, the combined response, which will be fed back to the bus units 114, 116, may be determined. Thereafter, step 326 may be performed. In step 326, the combined response may be interleaved with other combined responses received in the card from a higher level of the hierarchy (e.g., the system level). For example, the combined response associated with the issued command may be selected during a first time period, and a combined response associated with another command from the higher level of hierarchy may be selected during a subsequent time period or vice versa. In this manner, the selected combined response associated with the issued command may be transmitted to the issuing bus unit 114, 116 (and possibly to any other bus units 114, 116 required to execute the command).

Alternatively, if in step 324, the system 100 determines the combined response may not be handled at the current level (e.g., a card level) as defined by the memory map groups or domains, the combined response may be transmitted to buses 128, 132 coupled to all bus units 114, 116 included in the next higher level in the hierarchy (e.g., the system level). It should be noted similar responses may be received from a plurality of cards 108, 126, 130. Thereafter, step 328 may be performed (e.g., for each bus 128, 132 included in the current level). In step 328, responses required from the bus units 114, 116 to maintain coherence (e.g., included in the same group of bus units 114, 116 as the issuing bus unit 114, 116) may be collected to form a combined response. Since the combined response is at the highest level (e.g. the system level), such response has to be handled at the current level. The combined response may be transmitted to the next lower level (e.g., card level) where such response may be interleaved with other responses (e.g., responses which the system 100 determined could be handled by the card level in step 324). It should be noted that a plurality of such responses may be transmitted to the lower level (e.g., the card level) of the hierarchy.

In this manner, steps 316, 318, 322, 324 and 328 may serve as sub-steps in a third step in which a responses from bus units 114, 116 are collected, combined and transmitted up through as many levels of the coherency domain hierarchy as required. In this manner, bus units 114, 116 included in a desired level of the coherency domain hierarchy may be informed whether or not the command has been selected for execution. Further, steps 326 and 320 may serve as sub-steps in a fourth step in which the combined response may be reflected back to one or more bus units 114, 116 included in the same level as the issuing bus unit 114, 116 (e.g., bus units 114, 116 involved with the command execution, such as the issuing bus unit 114, 116) so such bus units 114, 116 may be informed whether or not the command will be executed and informed of their respective roles during execution. Thereafter, in a fifth step, if the combined response indicates the command is approved for execution, bus units 114, 116 associated with the command will execute the command. Therefore, as illustrated in FIG. 2, a single command may travel from left to right through the second exemplary process. However, not every command is required to travel up to the system level to execute.

Through use of the method 300, the system 100 may process a command from a bus unit 114, 116 and maintain memory coherence without unnecessarily requiring permission from all remaining bus units 114, 116 of the system 100. Consequently, the system 100 may reduce coherent command processing latency while maintaining memory coherence.

A conventional coherent multiple bus unit (e.g., multiprocessor) system employs a memory map with a flat structure. Such a memory map includes system-wide memory addresses. In such a conventional system, before a coherent command may be executed the command must be sent to each processor, and each processor must agree that the command can be executed without destroying the coherency of the system. Each processor may snoop (e.g., watch) all commands on a bus coupled thereto to see if the commands affect the processor's view of system memory. In multi-chip conventional systems, it takes many clock cycles for each processor to snoop a command and return respective permission for the command to be executed.

However for many applications it may not be necessary for system hardware to maintain memory coherency across an entire system. For example, if processors X, Y and Z of a system will not be using any memory owned by processors A, B and C of the system, then it would be an unprofitable waste of time and resources to force processors X, Y and Z to maintain a coherent view of the memory owned by processors A, B and C. Command latency may be dramatically reduced if system hardware does not need to get permission from every processor included in the system before executing every command. To achieve such benefit, the present methods and apparatus provide a system memory map 134 that may be divided into a hierarchy of coherent domains, and system hardware may enforce different amounts of memory coherency in those respective domains. By employing such a memory map 134, the present methods and apparatus do not unnecessarily require permission from all remaining bus units 114, 116 of a coherent multiple bus unit system 100 to process a command and maintain memory coherency. Consequently, the present methods and apparatus avoid disadvantages of the conventional system.

In some embodiments, coherency domains of the memory map 134 may be defined such that the coherency domain hierarchy matches a natural hierarchy of the system hardware design. In this manner, coherency may be required and maintained where coherency may be maintained quickly (e.g., between bus units 114, 116 on the same chip 110, 112), and may not be required and maintained where enforcing coherency is expensive and slow (e.g., between bus units 114, 116 that reside on separate cards 108, 126, 130 in the system 100).

Additionally, in some embodiments, coherency domains of the memory map 134 may be defined such that the coherency domain hierarchy also matches a hierarchy of software applications that may be executed by the system 100. For example, if all the bus units 114, 116 in the system 100 are expected to work on the same problem (e.g., execute the same application) simultaneously, domains may be defined to require system-wide coherency. In contrast, if different bus units 114, 116 of the system 100 are expected to execute different applications, respectively, large sections of memory 120, 122, 124 may not need to be coherent. Therefore, system-wide coherency may not be required. For example, "virtualization" techniques may allow different processors in a multi-processor system 100 to execute different tasks and/or even different operating systems as if such processors are separate systems. In such a system, enforcing system-wide memory coherency may be inefficient. Enforcing a lower level coherency (e.g., chip-level or card-level coherency) may greatly speed up command processing.

Alternatively, in some embodiments, the system memory map 134 may be designed to include a first domain, a non-coherency domain, including a subset (e.g., a selected range) of memory addresses available to a single chip 110, 112 included in the system 100. Remaining memory addresses available to the system 100 may be included in a second domain, a system-wide coherency domain.

The present methods and apparatus may be employed in a system including the Cell Broadband Engine (BE) processor, manufactured by the assignee of the present invention, IBM Corporation of Armonk, N.Y. For example, the Cell BE processor may be modified to include a memory map having a portion (e.g., a range of memory addresses) designated as a non-coherency domain. The logic included in a bus (e.g., command arbitration logic) of the processor may detect when a command requires access to an address in the non-coherency domain. Consequently, the Cell BE processor may process such a command without waiting for permission from other system processors. The reduced coherency requirement may make a significant difference when other processors in the system are on a different chip and it takes many cycles to get their snoop responses. More specifically, the Cell BE processor may be modified to include a system memory map 134 including a first domain, a non-coherency domain, including a subset (e.g., a selected range) of memory addresses available to a single chip 110, 112 included in the system 100. Remaining memory addresses available to the system 100 may be included in a second domain, a system-wide coherency domain.

The foregoing description discloses only exemplary embodiments of the invention. Modifications of the above disclosed apparatus and methods which fall within the scope of the invention will be readily apparent to those of ordinary skill in the art. For instance, it should be understood that software may need to enforce address protection to keep errant requests from accessing unauthorized memory domains. Additionally, as described above, two or more of the bus units 102 of the system 100 may be included in different chips and/or cards included therein. However, in some embodiments, two or more of the bus units 102 of the system 100 may be included in different chips, cards and/or computers included therein. In such embodiments, the methods described above may be modified to include an additional coherency domain hierarchy level, computer level, which may be between the card and system levels. Further, in some embodiments, the memory map 134 may include a group or domain (e.g., a non-coherent domain) that only requires the system 100, in response to a command that requires access to a memory address in the group from a bus unit 114, 116, to get permission from the owner of the memory (e.g., the bus unit 114, 116 corresponding thereto) including the address to process the command.

The coherency domains described above are exemplary, and therefore, a larger or smaller number of and/or different domains may be employed to partition the system memory map 134. Further, the first and second methods 200, 300 are exemplary, and therefore, a different method or process flow may be employed to reduce coherent command processing latency while maintaining memory coherence. For example, in some embodiments, at the chip-level, step 304 may be performed before arbitration step 302, and at the card-level, step 310 may be performed before arbitration step 308. Further, in the arbitration steps 302, 308, arbitration may be performed separately (and concurrently) on non-coherent commands that may be handled at the current level and coherent commands that are handled by a higher level. In this manner, non-coherent commands that may be handled locally may not have to wait behind global (e.g., commands to be handled at a higher level) during arbitration. Further, in some embodiments, interleaving steps 326 and 320 may be optional. Therefore, local and global command responses may be returned to bus units 114, 116 separately. For example, a command response handled locally at a level may be returned to bus units 114, 116 separately from a combined response from a higher level (e.g., a global command response).

Accordingly, while the present invention has been disclosed in connection with exemplary embodiments thereof, it should be understood that other embodiments may fall within the spirit and scope of the invention, as defined by the following claims.

The invention claimed is:

1. A method of reducing command processing latency while maintaining memory coherence, comprising:
   providing a system comprising a plurality of chips, wherein at least one chip comprises a plurality of bus units;
   providing a memory map including memory addresses available to the system; and
   arranging the memory addresses into a plurality of groups,
   wherein a first of the plurality of groups corresponds to a subset of memory addresses associated with a first chip in the system,
   wherein a command from a bus unit in the first chip accessing the first group is treated as coherent in the first chip and non-coherent for all other chips in the system,
   wherein a second of the plurality of the groups corresponds to a subset of memory addresses associated with the first chip in the system, and
   wherein a command from a bus unit in the first chip accessing the second group is treated as non-coherent with respect to all bus units in the first chip and all other chips in the system.

2. The method of claim 1 further comprising employing the memory map to process a command requiring access to the memory address issued by a bus unit.

3. The method of claim 2 further comprising reducing latency while processing the command.

4. The method of claim 2 wherein employing the memory map to process the command requiring access to the memory address issued by the bus unit includes processing the command requiring access to the memory address issued by the bus unit without requiring permission from all remaining bus units of the system.

5. The method of claim 4 wherein:
   the bus unit is included in a chip of the system; and
   employing the memory map to process the command requiring access to the memory address issued by the bus unit includes requiring permission from remaining bus units in the chip to process the command.

6. The method of claim 4 wherein:
   the bus unit is included in a card of the system; and
   employing the memory map to process the command requiring access to the memory address issued by the bus unit includes requiring permission from remaining bus units in the card to process the command.

7. The method of claim 4 wherein:
   the bus unit is included in a computer of the system; and
   employing the memory map to process the command requiring access to the memory address issued by the bus unit includes requiring permission from remaining bus units in the computer to process the command.

8. The method of claim 2 wherein employing the memory map to process the command requiring access to the memory address issued by the bus unit includes determining whether the system is required to get permission from remaining bus units of the system based on at least one of an address modifier, control bit or a command type.

9. The method of claim 1 wherein arranging the memory addresses into groups includes arranging the memory addresses into a plurality of groups based on one or more applications executed by the system.

10. An apparatus for reducing command processing latency while maintaining memory coherence, comprising:
    hardware logic adapted to store a memory map including memory addresses available to a system, the system including a plurality of chips, wherein at least one chip comprises a plurality of bus units;
    wherein the memory addresses are arranged into a plurality of groups,
    wherein a first of the plurality of the groups corresponds to a subset of memory addresses associated with a first chip in the system,
    wherein a command from a bus unit in the first chip accessing the first group is treated as coherent in the first chip and non-coherent for all other chips in the system,
    wherein a second of the plurality of the groups corresponds to a subset of memory addresses associated with the first chip in the system, and wherein a command from a bus unit in the first chip accessing the second group is treated as non-coherent with respect to all bus units in the first chip and all other chips in the system.

11. The apparatus of claim 10 wherein the memory map is adapted to:
be employed to process the command requiring access to the memory address issued by a bus unit; and
reduce latency while processing the command.

12. A computer program product, comprising:
a non-transitory medium readable by a computer, the computer readable medium having computer program code adapted to:
provide a memory map including memory addresses available to a system, the system including a plurality of chips, wherein at least one chip comprises a plurality of bus units; and
arrange the memory addresses into a plurality of groups,
wherein a first of the plurality of the groups corresponds to a subset of memory addresses associated with a first chip in the system,
wherein a command from a bus unit in the first chip accessing the first group is treated as coherent in the first chip and non-coherent for all other chips in the system,
wherein a second of the plurality of the groups corresponds to a subset of memory addresses associated with the first chip in the system, and
wherein a command from a bus unit in the first chip accessing the second group is treated as non-coherent with respect to all bus units in the first chip and all other chips in the system.

13. The computer program product of claim 12 wherein the memory map is adapted to:
be employed to process a command requiring access to the memory address issued by a bus unit; and
reduce latency while processing the command.

14. A system for reducing command processing latency while maintaining memory coherence, comprising:
a plurality of bus units, wherein two or more of the bus units may be on different chips, cards or computers of the system;
a plurality of buses coupling the bus units;
a plurality of memories, each of which corresponds to one or more of the bus units; and
a memory map including memory addresses available to the system,
wherein the memory addresses are arranged into a plurality of groups,
wherein a first of the plurality of the groups corresponds to a subset of memory addresses associated with a first chip in the system,
wherein a command from a bus unit in the first chip accessing the first group is treated as coherent in the first chip and non-coherent for all other chips in the system,
wherein a second of the plurality of the groups corresponds to a subset of memory addresses associated with the first chip in the system, and
wherein a command from a bus unit in the first chip accessing the second group is treated as non-coherent with respect to all bus units in the first chip and all other chips in the system.

15. The system of claim 14 wherein the system is further adapted to employ the memory map to process a command requiring access to the memory address issued by the first bus unit.

16. The system of claim 15 wherein the system is further adapted to reduce latency while processing the command.

17. The system of claim 15 wherein the system is further adapted to process the command requiring access to the memory address issued by the first bus unit without requiring permission from all remaining bus units of the system.

18. The system of claim 17 wherein:
the first bus unit is included in a chip of the system; and
the system is further adapted to require permission from remaining bus units on the chip to process the command.

19. The system of claim 17 wherein:
the first bus unit is included in a card of the system; and
the system is further adapted to require permission from remaining bus units on the card to process the command.

20. The system of claim 17 wherein:
the first bus unit is included in a computer of the system; and
the system is further adapted to require permission from remaining bus units in the computer to process the command.

21. The system of claim 15 wherein the system is further adapted to determine whether the system requires permission from remaining bus units of the system based on at least one of an address modifier, control bit or a command type.

22. The system of claim 14 wherein the memory addresses of the memory map are arranged into groups based on one or more applications executed by the system.

* * * * *